United States Patent

Harada et al.

[11] Patent Number: 5,861,437
[45] Date of Patent: Jan. 19, 1999

[54] POLYPHENYLENE ETHER RESIN

[75] Inventors: Hiromu Harada, Shiga-mura; Yukihiko Hotei, Hotaka-machi; Hideki Hujikura, Matsumoto; Yoshinori Nonaka, Toyoshina-machi; Koji Kamata, Matsumoto; Mitsuhiro Ichihara, Toyoshina-machi; Hiroshi Kusama; Humiyasu Satoh, both of Matsumoto, all of Japan

[73] Assignee: Kissei Pharmaceutical Company, Ltd., Japan

[21] Appl. No.: 930,433

[22] PCT Filed: Apr. 5, 1996

[86] PCT No.: PCT/JP96/00931

§ 371 Date: Oct. 7, 1997

§ 102(e) Date: Oct. 7, 1997

[87] PCT Pub. No.: WO96/32435

PCT Pub. Date: Oct. 17, 1996

[30] Foreign Application Priority Data

Apr. 8, 1995 [JP] Japan .................................. 7-118887
Nov. 1, 1995 [JP] Japan .................................. 7-320955

[51] Int. Cl.$^6$ .......................... A61K 31/785; C08G 65/48
[52] U.S. Cl. ...................... 514/643; 514/772.1; 514/788; 424/78.01; 424/78.14; 424/78.16; 424/78.36; 424/78.37; 525/390; 525/391; 525/397
[58] Field of Search ........................ 514/643, 722.1, 514/788; 424/78.01, 78.14, 78.16, 78.36, 78.37; 525/390, 391, 397

[56] References Cited

U.S. PATENT DOCUMENTS 3,780,171 12/1973 Irmscher et al. .......................... 424/79
4,863,998 9/1989 Yeager ..................................... 525/132

FOREIGN PATENT DOCUMENTS 40-24399 10/1965 Japan .
53-10386 1/1978 Japan .
1-297428 11/1989 Japan .

*Primary Examiner*—Frederick Krass
*Attorney, Agent, or Firm*—Depaoli & Frenkel, PC

[57] ABSTRACT

A poly(phenylene ether) resin composed of structural units represented by the general formula:

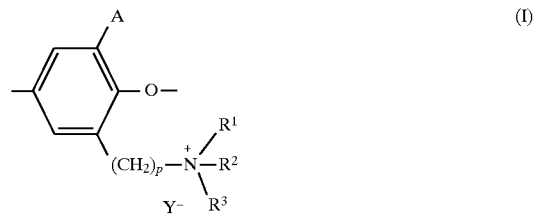

(I)

(wherein $R^1$, $R^2$ and $R^3$ represent each alkyl, cycloalkyl, etc. or H (provided that two or more of $R^1$, $R^2$ and $R^3$ do not represent H at the same time), or one of $R^1$, $R^2$ and $R^3$ represents alkyl or H while the others together form a saturated ring, or $R^1$, $R^2$ and $R^3$ together form an aromatic ring; A represents alkyl; p is an integer of from 3 to 5; and $Y^-$ represents a pharmaceutically acceptable acid residue) and/or structural units represented by the general formula:

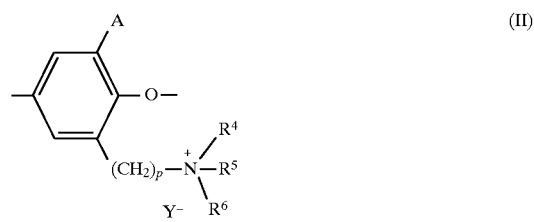

(II)

(wherein $R^4$, $R^5$ and $R^6$ represents each alkyl, cycloalkyl, etc. or H (provided that two or more of $R^4$, $R^5$ and $R^6$ do not represent H at the same time), or one of $R^4$, $R^5$ and $R^6$ represents alkyl or H while the others together form a saturated ring, or $R^4$, $R^5$ and $R^6$ together form an aromatic ring; and A, p and $Y^-$ have same meanings as defined above) and structural units represented by the general formula:

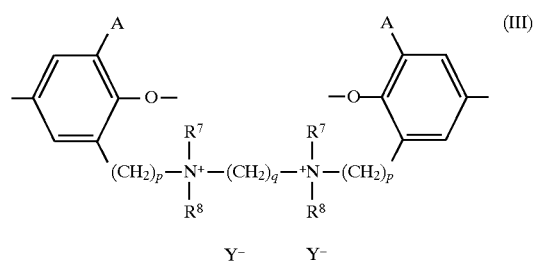

(III)

(wherein $R^7$ and $R^8$ represents each alkyl, cycloalkyl, etc. or together form a saturated ring; q is an integer of from 3 to 20; and A, p, and $Y^-$ have same meanings as defined above) wherein the sum of the contents of the structural units represented by the general formula (I) and the structural units represented by the general formula (II) amounts to 40 to 96% by mole and the content of the structural units represented by the general formula (III) amounts to 4 to 60% by mole based upon the content of phenylene ether component and a process for producing the same. The poly(phenylene ether) resins have the effect of adsorbing bile acids and are useful as a cholesterol reducing agent.

12 Claims, No Drawings

POLYPHENYLENE ETHER RESIN

TECHNICAL FIELD

The present invention relates to poly(phenylene ether) resins which have the effect of lowering the level of cholesterol and are useful as medicaments.

BACKGROUND ART

It is already known that a certain anion exchange resin has the effect of lowering the level of cholesterol in blood and therefore is applicable as a cholesterol reducing agent (U.S. Pat. Nos. 3,499,960 and 3,780,171, U. K. Patent No. 929, 391, a published Japanese Patent Application (Kokai) No. Sho 53-10386). The mechanism by which the level of cholesterol in blood is lowered by taking the anion exchange resin is considered as follows. Namely, the anion exchange resin adsorbs and fixes bile acids in the intestinal tract to prevent the reabsorption of the bile acids, and in the liver conversion from cholesterol, which is in an equilibrium relation with bile acids, to bile acids is stimulated by this action, and consequently, the cholesterol in blood is reduced.

Cholestyramine, a typical anion exchange resin which is used as a cholesterol reducing agent, has been employed as an agent for the treatment of hypercholesterolemia extensively and clinically. However, cholestyramine has the disadvantage that it must be taken in high doses (from 8 to 16 g per day except for excipients) to obtain effective action clinically. Furthermore, cholestyramine is chemical-structurally unstable and eliminates amines easily because it has quaternary ammonium groups at the benzyl position. Accordingly, cholestyramine has a bad smell typical to an aliphatic amine and is difficult to use by itself. Therefore, cholestyramine must be used together with a deodorant or a fragrance, or must be used after coating on the surface to reduce the bad smell. In consequence, there remains a problem that it is obliged to increase the amount of the dosage owing to use of an additive.

DISCLOSURE OF INVENTION

The present invention relates to a poly(phenylene ether) resin composed of structural units represented by the general formula:

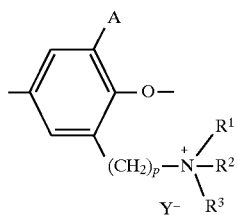

wherein $R^1$, $R^2$ and $R^3$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom with the proviso that two or more of $R^1$, $R^2$ and $R^3$ do not represent a hydrogen atom at the same time, or one of $R^1$, $R^2$ and $R^3$ represents an alkyl group having from 1 to 12 carbon atoms or a hydrogen atom while the others are adjacent to each other and together form a saturated ring together with the nitrogen atom binding to them, which may have one or more additional hetero atoms, or $R^1$, $R^2$ and $R^3$ are adjacent to each other and together form an aromatic ring together with the nitrogen atom binding to them, which may have one or more additional hetero atoms; A represents an alkyl group having from 1 to 3 carbon atoms; p is an integer of from 3 to 5; and $Y^-$ represents a pharmaceutically acceptable acid residue and/or structural units represented by the general formula:

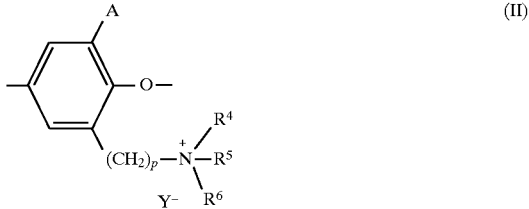

wherein $R^4$, $R^5$ and $R^6$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom with the proviso that two or more of $R^4$, $R^5$ and $R^6$ do not represent a hydrogen atom at the same time, or one of $R^4$, $R^5$ and $R^6$ represents an alkyl group having from 1 to 12 carbon atoms or a hydrogen atom while the others are adjacent to each other and together form a saturated ring together with the nitrogen atom binding to them, which may have one or more additional hetero atoms, or $R^4$, $R^5$ and $R^6$ are adjacent to each other and together form an aromatic ring together with the nitrogen atom binding to them, which may have one or more additional hetero atoms; A represents an alkyl group having from 1 to 3 carbon atoms; p is an integer of from 3 to 5; and $Y^-$ represents a pharmaceutically acceptable acid residue and structural units represented by the general formula:

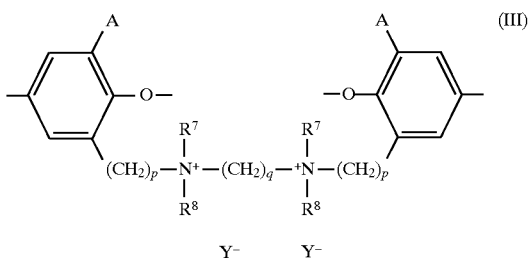

wherein $R^7$ and $R^8$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^7$ and $R^8$ are adjacent to each other and together form a saturated ring together with the nitrogen atom binding to them, which may have one or more additional hetero atoms; A represents an alkyl group having from 1 to 3 carbon atoms; p is an integer of from 3 to 5; q is an integer of from 3 to 20; and $Y^-$ represents a pharmaceutically acceptable acid residue wherein the sum of the contents of the structural units represented by the general formula (I) and the structural units represented by the general formula (II) amounts to 40 to 96% by mole and the content of the structural units represented by the general formula (III) amounts to 4 to 60% by mole based upon the content of phenylene ether component, which have the effect of adsorbing bile acids and are useful as a cholesterol reducing agent, and a process for producing the same.

The present invention relates to a pharmaceutical composition comprising, as an active ingredient, the above poly(phenylene ether) resin.

The present invention relates to a cholesterol reducing agent comprising, as an active ingredient, the above poly (phenylene ether) resin.

The present invention relates to a method for the treatment of hypercholesterolemia which comprises administering the above poly(phenylene ether) resin.

The present invention relates to a use of the above poly(phenylene ether) resin for the manufacture a pharmaceutical composition for the treatment of hypercholesterolemia.

The present invention relates to a use of the above poly(phenylene ether) resin as a cholesterol reducing agent.

BEST MODE FOR CARRYING OUT THE INVENTION

In the above poly(phenylene ether) resins of the present invention, the term "alkyl group having from 1 to 3 carbon atoms" means a methyl group, an ethyl group, a n-propyl group, an isopropyl group, the term "alkyl group having from 1 to 12 carbon atoms" means a straight- or branched-chain alkyl group such as a methyl group, an ethyl group, a n-propyl group, an isopropyl group, a n-butyl group, a n-decyl group, a n-dodecyl group or the like, the term "cycloalkyl group having from 3 to 15 carbon atoms" means a three or more membered saturated cyclic alkyl group such as a cyclopropyl group, a cyclohexyl group, a cyclododecyl group or the like, the term "cycloalkylalkyl group having from 4 to 15 carbon atoms" means an alkyl group substituted by a three or more membered saturated cyclic alkyl group such as a cyclopropylmethyl group, a cyclohexylmethyl group, a 2-cyclooctylethyl group, a 3-cyclooctylpropyl group, a 3-cyclodecylpropyl group or the like, and the term "aralkyl group having from 9 to 15 carbon atoms" means an alkyl group having three or more carbon atoms and substituted by an aryl group such as a 3-phenylpropyl group, a 4-phenylbutyl group, a 3-naphthylpropyl group or the like.

Also, the term "saturated ring together with a nitrogen atom binding to two of $R^1$, $R^2$ and $R^3$, two of $R^4$, $R^5$ and $R^6$ or both of $R^7$ and $R^8$, which may have one or more additional hetero atoms" means a pyrrolidine ring, a piperidine ring, a morpholine ring, a thiomorpholine ring, or the like.

Also, the term "aromatic ring together with a nitrogen atom binding to all of $R^1$, $R^2$ and $R^3$ or all of $R^4$, $R^5$ and $R^6$, which may have one or more additional hetero atoms" means an aromatic ring which may be substituted by an alkyl group having from 1 to 3 carbon atoms or a cycloalkyl group having from 3 to 15 carbon atoms such as 1-methylimidazole, 1-propylimidazole, 1-cyclohexylimidazole, thiazole, 2-methylthiazole or the like.

Furthermore, the term "pharmaceutically acceptable acid residue" means an acid residue of a mineral acid such as hydrochloric acid, hydrobromic acid, hydroiodic acid, sulfuric acid or the like, an organic acid such as methanesulfonic acid, acetic acid, fumaric acid or the like.

The poly(phenylene ether) resins of the present invention can be prepared by the following procedure.

For example, the compounds of the present invention can be prepared by subjecting a poly[2-(ω-halogenoalkyl) phenylene ether] compound represented by the general formula:

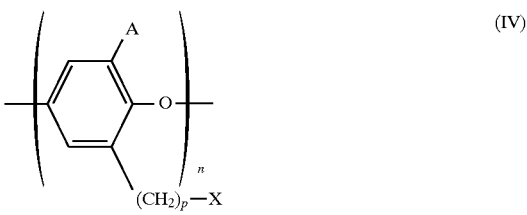

wherein X represents a chlorine atom, a bromine atom or an iodine atom; n is an integer of from 10 to 10,000; and A and p have the same meanings as defined above, which is dissolved in an organic solvent such as N,N-dimethylformamide, chloroform or toluene, to cross linkage using from 2 to 30 mole % (sum of phenylene ether component of the compound represented by the general formula (IV) above is 100 mole %) of a diamine compound represented by the general formula:

(wherein $R^7$, $R^8$ and q have the same meanings as defined above) in the presence of from 0.1 to 0.2 equivalent value of an inorganic base such as potassium carbonate and phase transfer catalyst such as tetrabutylammonium iodide and in the presence or absence of γ-cyclodextrin or polyvinylpyrrolidone at from room temperature to 120° C., preferably from 40° to 110° C. for from several hours to several days, occasionally, in a sealed tube and, occasionally, under pressure and an atmosphere of nitrogen, subjecting the resulting compound to reaction with an amine compound represented by the general formula:

(wherein $R^1$, $R^2$ and $R^3$ have the same meanings as defined above) at from room temperature to 120° C., preferably from 40° to 110° C. for from several hours to several days, occasionally, in a sealed tube and, occasionally, under pressure and an atmosphere of nitrogen, subjecting, if necessary, the resulting compound to reaction with an amine compound represented by the general formula:

(wherein $R^4$, $R^5$ and $R^6$ have the same meanings as defined above) at from room temperature to 120° C., preferably from 40° to 110° C. for from several hours to several days, occasionally, in a sealed tube and, occasionally, under pressure and an atmosphere of nitrogen, and subjecting, if necessary, the resulting compound to counter ion exchange using an appropriate acid and washing, if necessary, the resulting compound with an appropriate organic solvent, water or the like.

Of the poly(phenylene ether) resins of the present invention, poly(phenylene ether) resins composed of structural units represented by the general formula:

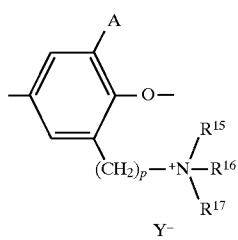
(VIII)

wherein $R^{15}$ and $R^{16}$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms, or $R^{15}$ and $R^{16}$ are adjacent to each other and together form a saturated ring together with the nitrogen atom binding to them, which may have one or more additional hetero atoms; $R^{17}$ represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom; and A, p and $Y^-$ have the same meanings as defined above and structural units represented by the general formula:

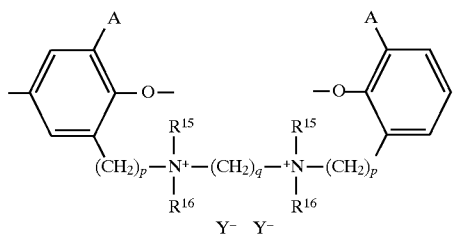
(IX)

(wherein $R^{15}$, $R^{16}$, A, p, q and $Y^-$ have the same meanings as defined above) wherein the content of the structural units represented by the general formula (VIII) amounts to 40 to 96 % by mole and the content of the structural units represented by the general formula (IX) amounts to 4 to 60% by mole based upon the content of phenylene ether component can be also prepared by subjecting a poly[2-(ω-substituted-aminoalkyl)phenylene ether] compound represented by the general formula:

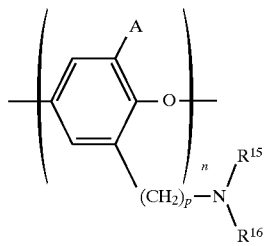
(X)

wherein $R^{15}$, $R^{16}$, A, p and n have the same meanings as defined above, which is dissolved in an organic solvent such as N,N-dimethylformamide, chloroform or toluene, to cross linkage using from 2 to 30 mole % (sum of phenylene ether component of the compound represented by the general formula (X) above is 100 mole %) of a dihalide compound represented by the general formula:

$$X—(CH_2)_q—X \quad (XI)$$

(wherein X and q have the same meanings as defined above) in the presence of water and in the presence or absence of γ-cyclodextrin or polyvinylpyrrolidone at from room temperature to 120° C., preferably from 40° to 110° C. for from several hours to several days, occasionally, in a sealed tube and, occasionally, under pressure and an atmosphere of nitrogen, subjecting, if necessary, the resulting compound to reaction with a halide compound represented by $$R^{18}—X \quad (XII)$$

(wherein $R^{18}$ represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms; and X has the same meaning as defined above) at from room temperature to 120° C., preferably from 40° to 110° C. for from several hours to several days, occasionally, in a sealed tube and, occasionally, under pressure and an atmosphere of nitrogen, and subjecting, if necessary, the resulting compound to counter ion exchange using an appropriate acid and washing, if necessary, the resulting compound with an appropriate organic solvent, water or the like.

For example, poly[2-(ω-halogenoalkyl)phenylene ether] compounds represented by the general formula (IV) above which are used as starting materials in the aforementioned production process can be prepared by subjecting a 2-(ω-hydroxyalkyl)phenol compound represented by the general formula:

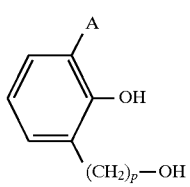
(XIII)

(wherein A and p have the same meanings as defined above) to polymerization in the presence of from 0.001 to 10 mole, preferably from 0.005 to 3 mole of a tertiary amine such as pyridine, triethylamine, triethanolamine and N,N,N',N'-tetramethylethylenediamine to 1 mole of the compound represented by the general formula (XIII) above and from 0.1 to 100 mole %, preferably from 0.5 to 20 mole % of an oxidative catalyst such as copper(I) chloride, manganese(I) chloride and cobalt (II) chloride and in the presence of a solvent, preferably a hydrocarbon such as toluene or a mixed solvent of a hydrocarbon such as toluene and an alcohol such as methanol at from 0° to 40° C., preferably from 10° to 30° C. for from 10 minutes to 2 days, preferably from 30 minutes to 24 hours under an atmosphere of oxygen or an air, and subjecting the resulting poly[2-(ω-hydroxyalkyl)phenylene ether] compound represented by the general formula:

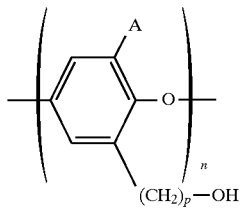
(XIV)

(wherein A, p and n have the same meanings as defined above) to halogenation using a halogenating agent such as thionyl chloride and carbon tetrabromide-triphenylphosphine.

Of poly[2-(ω-halogenoalkyl)phenylene ether] compounds represented by the general formula (IV) above, poly[2-(ω-chloroalkyl)phenylene ether] compounds where X represents a chlorine atom represented by the general formula:

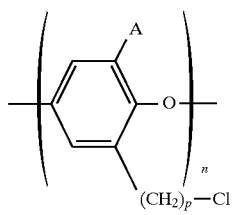

(IVa)

(wherein A, p and n have the same meanings as defined above) can be prepared by subjecting a 2-(ω-chloroalkyl)phenol compound represented by the general formula:

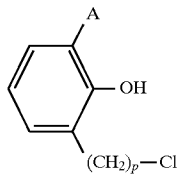

(XV)

(wherein A and p have the same meanings as defined above) to polymerization in the presence of from 0.001 to 10 mole, preferably from 0.005 to 3 mole of a tertiary amine such as pyridine, triethylamine, triethanolamine and N,N,N',N'-tetramethylethylenediamine to 1 mole of the compound represented by the general formula (XV) above and from 0.1 to 100 mole %, preferably from 0.5 to 20 mole % of an oxidative catalyst such as copper (I) chloride, manganese (I) chloride and cobalt (II) chloride and in the presence of a solvent, preferably a hydrocarbon such as toluene or a mixed solvent of a hydrocarbon such as toluene and an alcohol such as methanol at from 0° to 40° C., preferably from 10° to 30° C. for from 10 minutes to 2 days, preferably from 30 minutes to 24 hours under an atmosphere of oxygen or an air.

Of poly[2-(ω-halogenoalkyl)phenylene ether] compounds represented by the general formula (IV) above, poly (phenylene ether) compounds where X represents a bromine atom or an iodine atom can be also prepared by subjecting the poly[2-(ω-chloroalkyl)phenylene ether] compound represented by the general formula (IVa) above to halogen exchange using a haloalkali metal salt such as potassium bromide, sodium bromide, potassium iodide and sodium iodide.

Of poly[2-(ω-halogenoalkyl)phenylene ether] compounds represented by the general formula (IV) above, poly[2-(ω-halogenopropyl)phenylene ether] compounds where q is 3 represented by the general formula:

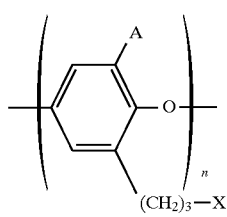

(IVb)

(wherein A, X and n have the same meanings as defined above) can be prepared by subjecting a 2-allylphenol compound represented by the formula:

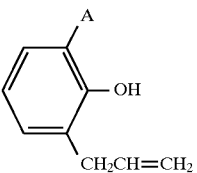

(XVI)

(wherein A has the same meaning as defined above) to polymerization in the presence of from 0.001 to 10 mole, preferably from 0.005 to 3 mole of a tertiary amine such as pyridine, triethylamine, triethanolamine and N,N,N',N'-tetramethylethylenediamine to 1 mole of the compound represented by the general formula (XVI) above and from 0.1 to 100 mole %, preferably from 0.5 to 20 mole % of an oxidative catalyst such as copper (I) chloride, manganese (I) chloride and cobalt (II) chloride and in the presence of a solvent, preferably a hydrocarbon such as toluene or a mixed solvent of a hydrocarbon such as toluene and an alcohol such as methanol at from 0° to 40° C., preferably from 10° to 30° C. for from 10 minutes to 2 days, preferably from 30 minutes to 24 hours under an atmosphere of oxygen or an air, subjecting the resulting poly(2-allylphenylene ether) compound represented by the general formula:

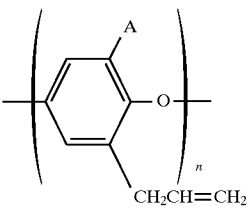

(XVII)

(wherein A and n have the same meanings as defined above) to reaction with borane-tetrahydrofuran complex, subjecting the resulting compound to treatment with aqueous sodium hydroxide and hydrogen peroxide, and subjecting the resulting poly[2-(3-hydroxypropyl)phenylene ether] compound represented by the general formula:

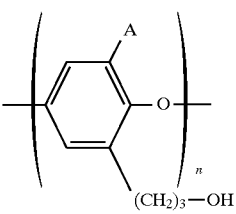

(XIVa)

(wherein A and n have the same meanings as defined above) to halogenation using a halogenating agent such as thionyl chloride and carbon tetrabromide-triphenylphosphine.

Of poly[2-(3-halogenopropyl)phenylene ether] compounds represented by the general formula (IVb) above, poly[2-(3-iodopropyl)phenylene ether] compounds where X is an iodine atom represented by the general formula:

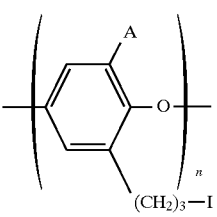

(IVc)

(wherein A and n have the same meanings as defined above) can be prepared by subjecting the poly(3-allylphenylene ether) compound represented by the general formula (XVII) above to treatment with zirconocene chloride hydride-iodine.

For example, the poly[2-(ω-substituted-aminoalkyl) phenylene ether] compounds represented by the general formula (X) above which are used as starting materials in the aforementioned production process can be prepared by subjecting a poly[2-(ω-halogenoalkyl)phenylene ether] compound represented by the general formula (IV) above to reaction with an amine compound represented by the general formula:

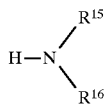
(XVIII)

wherein R15 and $R^{16}$ have the same meanings as defined above, or by subjecting a 2-(ω-substituted-aminoalkyl) phenol compound represented by the general formula:

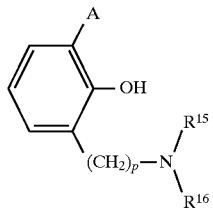
(XIX)

(wherein $R^{15}$, $R^{16}$, A and p have the same meanings as defined above) to polymerization in the presence of from 0.001 to 10 mole, preferably from 0.005 to 3 mole of a tertiary amine such as pyridine, triethylamine, triethanolamine and N,N,N', N'-tetramethylethylenediamine to 1 mole of the compound represented by the general formula (XIX) above and from 0.1 to 100 mole %, preferably from 0.5 to 20 mole % of an oxidative catalyst such as copper (I) chloride, manganese (I) chloride and cobalt (II) chloride and in the presence of a solvent, preferably a hydrocarbon such as toluene or a mixed solvent of a hydrocarbon such as toluene and an alcohol such as methanol at from 0° to 40° C., preferably from 10° to 30° C. for from 10 minutes to 2 days, preferably from 30 minutes to 24 hours under an atmosphere of oxygen or an air.

For example, the 2-(ω-chloroalkyl)phenol compounds represented by the general formula (XV) above which are used as starting materials in the aforementioned production process can be prepared by subjecting the corresponding 2-(ω-hydroxyalkyl)phenol compound to chlorination using an appropriate chlorinating agent such as thionyl chloride and methanesulfonyl chloride.

The compounds represented by the general formulae (V), (VI), (VII), (XI), (XII), (XIII), (XVI), (XVIII) and (XIX) above which are used as starting materials in the aforementioned production process are available commercially, or can be prepared by a process described in a literature or analogous processes thereto.

In the poly(phenylene ether) resins of the present invention, as examples of the preferred quaternary ammonium groups, a trimethylammonium group, a dimethylbutylammonium group, a dimethylcyclohexylammonium group, a dimethylcyclohexylmethylammonium group and a dimethyl(3-phenylpropyl)-ammonium group are illustrated, and as examples of the preferred tertiary amino groups, a dimethylamino group, a cyclohexylmethylamino group, a cyclohexylmethylmethylamino group, a butylmethylamino group and a methyl(3-phenylpropyl)-amino group are illustrated. Examples of the more preferred quaternary ammonium groups are a dimethylbutylammonium group and a dimethylcyclohexylammonium group.

In the poly(phenylene ether) resins of the present invention, the preferred length of alkylene chain between the benzene ring and the ammonium group, namely, p is 3.

In the poly(phenylene ether) resins of the present invention, the preferred substituent A is a methyl group.

Furthermore, in the poly(phenylene ether) resins of the present invention, as examples of the preferred acid residues, a chlorine ion, a bromine ion and a ½ sulfate ion are illustrated. The most preferred acid residue is a chlorine ion.

The poly(phenylene ether) resins of the present invention have excellent effects of adsorbing bile acids. Accordingly, in the in vitro test for determination of the bound quantity of bile acids using sodium glycocholate and sodium taurodeoxycholate, the poly(phenylene ether) resins of the present invention exhibit effects of adsorbing bile acids equal to or higher than that of cholestyramine (Dowx 1×2 dried resin). In particular, poly(phenylene ether) resins obtained by Examples 5, 6, 7, 8, 9, 10, 12, 13, 14, 21, 24, 31, 32, 33 and 34 are preferred.

In the in vivo test for measuring hypocholesterolemic activity using hamsters (weight: from 75 to 80 g), the poly (phenylene ether) resins of the present invention also exhibit markedly more potent cholesterol lowering effect than that of cholestyramine (Dowx 1×2 dried resin). Accordingly, serum cholesterol level in two groups (normal diet group, high cholesterol diet group) which were fed a normal diet (CE-2) or a normal diet containing 0.5% cholesterol (high cholesterol diet) for two weeks was about 200 mg/dl and 300 mg/dl, respectively, and the hypocholesterolemic activities of each resins were compared and estimated as the weight percentage of resin to lower the serum cholesterol level of hamsters fed the high cholesterol diet to that of hamsters fed the normal diet ($EC_{100}$). As the result, groups which were fed a diet containing from 0.5 to 1% of the poly(phenylene ether) resin of the present invention had serum cholesterol level equal to or lower than that of a group which was fed a diet containing 3% of cholestyramine. In particular, poly (phenylene ether) resins obtained by Examples 33 and 34 exhibit cholesterol lowering effects equal to or higher than that of cholestyramine at a dose of from ⅕ to ¼ of cholestyramine.

When the poly(phenylene ether) resins of the present invention are employed in the practical treatment, they are administered orally in the form of appropriate pharmaceutical compositions such as tablets, powders, fine granules, granules, capsules, and the like. These pharmaceutical compositions can be formulated in accordance with conventional methods using conventional pharmaceutical carriers, excipients and other additives optionally. The poly(phenylene ether) resins of the present invention can be employed as the above pharmaceutical compositions or the resin alone.

In formulating the pharmaceutical compositions, conventional excipients, disintegrators, binders, lubricants and the like can be used optionally, and, for example, lactose, starch, sodium carboxymethyl starch, povidone, magnesium stearate and polyoxyethylene glycol fatty acid ester can be illustrated.

The dosage is appropriately decided depending on the sex, age, body weight, degree of symptoms and the like of each patient to be treated, which is approximately within the range of from 0.1 to 9 g per day per adult human, preferably the range of from 0.1 to 5 g per day per adult human, and the daily dosage can be divided into one to several doses per day.

In the case of the oral administration, the poly(phenylene ether) resins may be taken in a state suspended in water or other liquid or in a state mixed in food.

EXAMPLE

The present invention is further illustrated in more detail by way of the following Reference Examples, Examples and Test Examples.

Reference Example 1

Poly(2-allyl-6-methyl-1,4-phenylene ether)

To benzene (5 L) were added pyridine (162 mL), cuprous chloride (9.9 g), magnesium sulfate (60.2 g) and 2-allyl-6-methylphenol (148.21 g). After stirring overnight at 10° C., a solution of methanol and concentrated hydrochloric acid (5:1) was added to the reaction mixture. The precipitated polymer was dissolved in chloroform (1 L) and purified by silica gel chromatography. The resulting polymer was reprecipitated with methanol, collected by centrifugation and dried to give the title compound (110 g).

$^1$H-NMR (400 MHz, CDCl$_3$) δ ppm: 2.0–2.2, 3.1–3.3, 4.85–5.1, 5.7–5.9, 6.4–6.6

IR (film): 1188, 1469, 1609, 2924 cm$^{-1}$

Reference Example 2

Poly[2-(3-hydroxypropyl)-6-methyl-1,4-phenylene ether]

To a mechanically stirred solution of borane-tetrahydrofuran complex (900 mL, 1M solution) in tetrahydrofuran (900 mL) was added dropwise a solution of poly (2-allyl-6-methyl-1,4-phenylene ether) (90 g) in tetrahydrofuran (900 mL) under ice-cooling. After stirring overnight at room temperature, a 2N aqueous sodium hydroxide solution (410 mL) and a 30% aqueous hydrogen peroxide solution (93 mL) were added to the reaction mixture under ice-cooling. After stirring overnight at room temperature, the resulting mixture was washed with brine and centrifuged. The organic layer was dried over magnesium sulfate and filtered through Celite®. To the filtrate was added hexane, and the resulting precipitates were collected by filtration and dried to give the title compound (90 g).

$^1$H-NMR (400 MHz, DMSO-d$_6$) δ ppm: 1.4–1.7, 1.9–2.1, 2.25–2.6, 3.2–3.4, 4.3–4.6, 6.4–6.6

IR (film): 1188, 1469, 1602, 2875, 2938, 3100~3600 cm$^{-1}$

Reference Example 3

Poly[2-(3-bromopropyl)-6-methyl-1,4-phenylene ether]

To tetrahydrofuran (1.5 L) were added poly[2-(3-hydroxypropyl)-6-methyl-1,4-phenylene ether] (82.1 g) and carbontetrabromide (331.6 g). Triphenylphosphine (144.3 g) dissolved in tetrahydrofuran (500 mL) was added dropwise to the mixture. After stirring overnight at room temperature, the reaction mixture was evaporated. The residue was washed with methanol several times, collected by filtration and dried to give the title compound (105.4 g).

$^1$H-NMR (400 MHz, CDCl$_3$) δ ppm: 1.9–2.2, 2.4–2.7, 3.2–3.45, 6.4–6.7

IR (film): 1188, 1469, 1609, 2924, 2959 cm$^{-1}$

Reference Example 4

Poly[2-(3-iodopropyl)-6-methyl-1,4-phenylene ether]

To a suspension of zirconocene chloride hydride (5.2 g) in tetrahydrofuran (20 mL) was added poly[2-allyl-6-methyl-1,4-phenylene ether] (1.0 g). After stirring at room temperature for 1 hour, iodine (5.1 g) was added to the reaction mixture. Then the mixture was stirred at room temperature for 50 minutes and at 50° C. for 15 minutes. After addition of a 1M hydrochloric acid (10 mL), the mixture was stirred for 30 minutes. The reaction mixture was extracted with chloroform (500 mL) and a 1M hydrochloric acid (300 mL). The organic layer was washed with a 0.5N aqueous sodium thiosulfate solution (500 mL) and brine, dried over magnesium sulfate and evaporated. The residue was dissolved in chloroform and precipitated with hexane to give the title compound (1.45 g).

$^1$H-NMR (400 MHz, CDCl$_3$) δ ppm: 2.0–2.2, 2.45–2.65, 3.0–3.2, 6.4–6.7

Reference Example 5

2-(3-Hydroxypropyl)-6-methylphenol

To a borane-tetrahydrofuran complex solution (100 mL, 1M solution) was added dropwise 2-allyl-6-methylphenol (21 g) under ice-cooling. After stirring at room temperature for 3 hours, a 2N aqueous sodium hydroxide solution (55 mL) and a 30% aqueous hydrogen peroxide solution (12 mL) were added to the reaction mixture under ice-cooling. After stirring overnight at room temperature, the reaction mixture was acidified with a 2N hydrochloric acid and extracted with diethyl ether. The organic layer was washed with brine, dried over magnesium sulfate, filtered and evaporated. The residue was purified by silica gel column chromatography and dried to give the title compound (15 g).

$^1$H-NMR (400 MHz, CDCl$_3$) δ ppm: 1.8–1.9(2H, m), 2.2(3H, s), 2.6($^1$H, br s), 2.8(2H, t, J=6.8 Hz), 3.6(2H, m), 6.7–7.0(4H, m) Mass (FAB$^+$, m/z) : 166 (M$^+$)

Reference Example 6

Poly[2-(3-hydroxypropyl)-6-methyl-1,4-phenylene ether]

To pyridine (40 mL) were added cuprous chloride (119 mg), magnesium sulfate (724 mg) and 2-(3-hydroxypropyl) -6-methyl-phenol (2.00 g). After stirring overnight at room temperature, the reaction mixture was added to distilled water, and the resulting precipitates were washed with distilled water. The precipitates were dissolved in tetrahydrofuran, dried over magnesium sulfate, reprecipitated with hexane, collected by filtration and dried to give the title compound (1.43 g).

$^1$H-NMR (400 MHz, DMSO-d$_6$) δ ppm: 1.4–1.7, 1.9–2.1, 2.2–2.6, 3.2–3.4, 3.8–4.8, 6.4–6.6

IR (film): 1188, 1469, 1602, 2875, 2938, 3100~3600 cm$^{-1}$

Reference Example 7

Poly[2-(3-bromopropyl)-6-methyl-1,4-phenylene ether]

To tetrahydrofuran (10 mL) were added poly[2-(3-hydroxy-propyl)-6-methyl-1,4-phenylene ether] (0.50 g) and carbontetrabromide (2.02 g). Triphenylphosphine (880 mg) dissolved in tetrahydrofuran (3 mL) was added dropwise to the mixture. After stirring at room temperature for 3 hours, the reaction mixture was evaporated. The residue was washed with methanol several times, collected by filtration and dried to give the title compound (509 mg).

$^1$H-NMR (400 MHz, CDCl$_3$) δ ppm: 2.0–2.2, 2.5–2.65, 3.25–3.4, 6.4–6.6

IR (film): 1188, 1469, 1609, 2959 cm$^{-1}$

Reference Example 8

Poly[2-[3-(N,N-dimethylamino)propyl]-6-methyl-1, 4-phenylene ether]

Poly[2-(3-bromopropyl)-6-methyl-1,4-phenylene ether] (80 g) was dissolved in N,N-dimethylformamide (2 L), and a 50% aqueous N,N-dimethylamine solution (100 mL) was added to the solution. After stirring at 60° C. for 2 days, the reaction mixture was added dropwise to a 27% aqueous sodium hydroxide solution (18 L). The resulting precipitates were collected by filtration, washed with water while being pulverized in a mortar, collected by filtration and dried to give the title compound (84 g).

$^1$H-NMR (400 MHz, CDCl$_3$) δ ppm: 1.6–1.8, 2.0–2.2, 2.4–2.5, 6.4–6.55

IR (film): 1188, 1469, 1602, 2770, 2945 cm$^{-1}$

Reference Example 9

Poly[2-[3-(N,N-dimethylamino)propyl]-6-methyl-1,4-phenylene ether]

To pyridine (20 mL) were added cuprous chloride (51 mg) and 2-[3-(N,N-dimethylamino) propyl]-6-methylphenol (1.0 g). After stirring at 20° C. for 48 hours, the reaction mixture was evaporated. To the residue was added a 1N aqueous sodium hydroxide solution (80 mL), and the mixture was stirred sufficiently. The resulting precipitates were collected by filtration, dried and dissolved in methanol (100 mL). The solution was filtered through Celite®, and the filtrate was evaporated. The residue was dissolved in methanol (10 mL) and reprecipitated with a 1N aqueous sodium hydroxide solution (250 mL). The reprecipitates were collected by filtration, washed with water and dried to give the title compound (762 mg).

$^1$H-NMR (400 MHz, CDCl$_3$) δ ppm: 1.6–1.8, 2.0–2.2, 2.4–2.5, 6.4–6.55

IR (film): 1188, 1469, 1602, 2770, 2945 cm$_{-1}$

Reference Example 10

Poly[2-[3-(N,N-dimethylamino)propyl]-6-methyl-1,4-phenylene ether]

To pyridine (20 mL) were added cuprous chloride (51 mg), magnesium sulfate (0.62 g) and 2-[3-(N,N-dimethylamino)propyl]-6-methylphenol (1.0 g). After stirring at 20° C. for 48 hours, the reaction mixture was evaporated. To the residue was added a 1N aqueous sodium hydroxide solution (80 mL), and the mixture was stirred sufficiently. The resulting precipitates were collected by filtration, dried and dissolved in methanol (100 mL). The solution was filtered through Celite®, and the filtrate was evaporated. The residue was dissolved in methanol (10 mL) and reprecipitated with a 1N aqueous sodium hydroxide solution (250 mL). The reprecipitates were collected by filtration, washed with water and dried to give the title compound (702 mg).

$^1$H-NMR (400 MHz, CDCl$_3$) δ ppm: 1.6–1.8, 2.0–2.2, 2.4–2.5, 6.4–6.55

IR (film): 1188, 1469, 1602, 2770, 2945 cm$^{-1}$

Reference Example 11

Poly[2-[3-(N-cyclohexyl-N-methylamino)propyl]-6-methyl-1,4-phenylene ether]

To pyridine (20 mL) were added cuprous chloride (51 mg), magnesium sulfate (0.60 g) and a solution of 2-[3-(N-cyclo-hexyl-N-methylamino)propyl]-6-methylphenol (1.0 g) in pyridine (5 mL). After stirring at 20° C. for 48 hours, the reaction mixture was evaporated. To the residue was added a 1N aqueous sodium hydroxide solution (70 mL), and the mixture was stirred sufficiently. The resulting precipitates were collected by filtration, dried and dissolved in ethanol (100 mL). The solution was filtered through Celite®, and the filtrate was evaporated. The residue was dissolved in ethanol (10 mL) and reprecipitated with a 1N aqueous sodium hydroxide solution (250 mL). The reprecipitates were collected by filtration, washed with water and dried to give the title compound (75 mg).

$^1$H-NMR (400 MHz, CDCl$_3$) δ ppm: 0.9–2.8, 3.0–3.4, 6.3–7.2

IR (film): 1188, 1469, 1659, 2854, 2931 cm$^{-1}$

Reference Example 12

2-(3-chloropropyl)-6-methylphenol

To a solution of 2-(3-hydroxypropyl)-6-methylphenol (3.0 g) in tetrahydrofuran (30 mL) were added pyridine (730 μL), thionyl chloride (2 mL) and one drop of N,N-dimethylformamide. After stirring at 60° C. for 2 hours, the reaction mixture was evaporated, and then diethyl ether was added to the residue. The resulting solution was washed with distilled water and brine, dried over anhydrous magnesium sulfate and evaporated in vacuo to give the title compound in quantitative yield.

$^1$H-NMR (400 MHz, CDCl$_3$) δ ppm: 2.09(2H, m), 2.25 (3H, s), 2.78(2H, t, J=7.3 Hz), 3.57(2H, t, J=6.4 Hz), 4.70(1H, s), 6.79(1H, t, J=7.5 Hz), 6.93–7.05(2H, m)

Reference Example 13

2-(3-Chloropropyl)-6-methylphenol

A solution of N,N-dimethylaniline (24.0 mL) in toluene (20.0 mL) was bubbled with hydrochloride gas to prepare the corresponding hydrochloride. To the mixture were added 2-(3-hydroxypropyl)-6-methylphenol (20.0 g) and methanesulfonyl chloride (10.2 mL), and the resulting mixture was stirred at 110° C. for 1.5 hours. After cooling, methanol (2.4 mL) was added to the reaction mixture. The mixture was washed with distilled water, an aqueous sodium bicarbonate solution, distilled water and brine successively and then evaporated to give a solution of 2-(3-chloropropyl)-6-methylphenol (19.9 g) in toluene (21 g). NMR spectrum of this compound was identical with that of Reference Example 12.

Reference Example 14

Poly[2-(3-chloropropyl)-6-methyl-1,4-phenylene ether]

To pyridine (1.3 mL) were added cuprous chloride (54 mg) and magnesium sulfate (130 mg), and the mixture was stirred at room temperature for 10 minutes under an atmosphere of oxygen. After addition of 2-(3-chloropropyl)-6-methylphenol (1.0 g) to the reaction mixture, the mixture was stirred at room temperature for 2 days under an atmosphere of oxygen. After addition of toluene (10 mL) to the reaction mixture, hydrochloride gas was bubbled into the mixture with cooling, and the supernatant was added to methanol. After the resulting precipitates were pulverized sufficiently, the mixture was stirred for 30 minutes. The resulting polymer was collected by filtration and dried to give poly[2-(3-chloropropyl)-6-methyl-1,4-phenylene ether] (509 mg).

$^1$H-NMR (400 MHz, CDCl$_3$) δ ppm: 1.85–2.3, 2.45–2.8, 3.35–3.65, 6.3–6.65

IR (film): 1188, 1307, 1469, 1602, 2959 cm$^{-1}$

Reference Example 15

Poly[2-(3-chloropropyl)-6-methyl-1,4-phenylene ether]

To pyridine (44 μL) was added cuprous chloride (54 mg), and the mixture was stirred at room temperature for 10 minutes under an atmosphere of oxygen. After addition of 2-(3-chloro-propyl)-6-methylphenol (1.0 g), the mixture was stirred at room temperature for 9 hours under an atmosphere of oxygen. After addition of toluene (5 mL) to the reaction mixture, pyridine was removed in vacuo. After addition of toluene (5 mL) again, hydrochloride gas was bubbled into the mixture with cooling. The supernatant was purified by silica gel column chromatography, and the solution was added to methanol. After the resulting precipitates were pulverized sufficiently, the mixture was stirred for 30 minutes. The precipitates were collected by filtration and dried to give poly[2-(3-chloro-propyl)-6-methyl-1,4-phenylene ether] (385 mg). NMR spectrum of this compound was identical with that of Reference Example 14.

Reference Example 16

Poly[2-(3-chloropropyl)-6-methyl-1,4-phenylene ether]

To triethylamine (2.27 mL) were added cuprous chloride (54 mg) and magnesium sulfate (130 mg), and the mixture was stirred at room temperature for 10 minutes under an atmosphere of oxygen. After addition of 2-(3-chloropropyl)-6-methylphenol (1.0 g), the mixture was stirred at room temperature for 18 hours under an atmosphere of oxygen. After addition of toluene (5 mL) to the reaction mixture, triethylamine was removed in vacuo. After addition of toluene (5 mL) again, hydrochloride gas was bubbled into the mixture with cooling. The supernatant was added to methanol, and the precipitated polymer was collected by filtration and dried to give poly[2-(3-chloro-propyl)-6-methyl-1,4-phenylene ether] (415 mg). NMR spectrum of this compound was identical with that of Reference Example 14.

Reference Example 17

Poly[2-(3-chloropropyl)-6-methyl-1,4-phenylene ether]

To pyridine (1.3 mL) were added cuprous chloride (54 mg) and magnesium sulfate (130 mg), and the mixture was stirred at room temperature for 10 minutes under an air. After addition of 2-(3-chloropropyl)-6-methylphenol (1.0 g) to the reaction mixture, the mixture was stirred at room temperature for 18 hours under an air. After addition of toluene (5 mL) to the reaction mixture, pyridine was removed in vacuo. After addition of toluene (5 mL) again, hydrochloride gas was bubbled into the mixture with cooling. The supernatant was added to methanol, and the precipitated polymer was collected by filtration and dried to give poly[2-(3-chloropropyl)-6-methyl-1,4-phenylene ether](113 mg). NMR spectrum of this compound was identical with that of Reference Example 14.

Reference Example 18

Poly[2-(3-chloropropyl)-6-methyl-1,4-phenylene ether]

To pyridine (17.9 mL) was added cuprous chloride (13.2 g), and the mixture was stirred at room temperature for 10 minutes under an atmosphere of oxygen. After addition of a solution of 2-(3-chloropropyl)-6-methylphenol (73.6 g) in toluene (29 g) obtained by the similar manner to Reference Example 13, the mixture was stirred overnight at room temperature under an atmosphere of oxygen. After addition of tetrahydrofuran (600 mL) to the reaction mixture, the mixture was acidified by bubbling of hydrochloride gas. The solution containing polymer was added to methanol (10 L), and the precipitated polymer was dissolved in toluene (500 mL), and the supernatant was added to methanol (10 L). After the reprecipitates were pulverized sufficiently, the mixture was stirred for 30 minutes. The reprecipitated polymer was collected by filtration and dried to give poly [2-(3-chloropropyl)-6-methyl-1,4-phenylene ether] (52.2 g). NMR spectrum of this compound was identical with that of Reference Example 14.

Reference Example 19

Poly[2-(3-chloropropyl)-6-methyl-1,4-phenylene ether]

To toluene (14 mL) were added cuprous chloride (80.5 mg), N,N,N',N'-tetramethylethylenediamine (94.5 mg) and trimethylstearylammonium chloride (283 mg), and the mixture was stirred at room temperature for 5 minutes under an atmosphere of oxygen. After addition of a solution of 2-(3-chloropropyl)-6-methylphenol (5.00 g) in toluene (5.12 g) obtained by the similar manner to Reference Example 13, the mixture was stirred under an atmosphere of oxygen keeping at 30°–32° C. for 1 hour. When the viscosity of the solution increased, the polymerization was stopped by the addition of toluene (20 mL), catechol (179 mg), sodium hydrosulfite (283 mg) and water (5 mL). The formed polymer was precipitated with methanol (800 mL), collected by filtration and dried to give poly[2-(3-chloropropyl)-6-methyl-1,4-phenylene ether] (4.24 g). NMR spectrum of this compound was identical with that of Reference Example 14.

Reference Example 20

Poly[2-(3-chloropropyl)-6-methyl-1,4-phenylene ether]

To toluene (14 mL) were added cuprous chloride (26.8 mg), N,N,N',N'-tetramethylethylenediamine (40.9 mg) and trimethylstearylammonium chloride (94.0 mg), and the mixture was stirred at room temperature for 5 minutes under an atmosphere of oxygen. After addition of a solution of 2-(3-chloropropyl)-6-methylphenol (5.00 g) in toluene (5.12 g) obtained by the similar manner to Reference Example 13, the mixture was stirred under an atmosphere of oxygen keeping at 30°–32° C. for 1 hour. When the viscosity of the solution increased, the polymerization was stopped by the addition of toluene (20 mL), catechol (59.7 mg), sodium hydrosulfite (94.4 mg) and water (5 mL). The formed polymer was precipitated with methanol (800 mL), collected by filtration and dried to give poly[2-(3-chloropropyl)-6-methyl-1,4-phenylene ether] (4.07 g). NMR spectrum of this compound was identical with that of Reference Example 14.

Example 1

To N,N-dimethylformamide (1.0 mL) were added poly [2-(3-iodopropyl)-6-methyl-1,4-phenylene ether] (0.15 g) and N,N, N',N'-tetramethyl-1,8-diaminooctane (2.2 mg), and the mixture was stirred at 60° C. for 3 days. After addition of N,N-dimethylcyclohexylmethylamine (0.78 g), the mixture was stirred at 60° C. for 2 days. The reaction mixture was added to acetone, and the resulting precipitates were washed with acetone and then dried to give a poly(phenylene ether) resin (114 mg).

Example 2

To N,N-dimethylformamide (1.0 mL) were added poly[2-[3-(N,N-dimethylamino)propyl]-6-methyl-1,4-phenylene ether] (0.20 g), 1,8-diiodooctane (6.6 mg) and anhydrous potassium carbonate (0.15 g), and the mixture was stirred at 60° C. for 3 days. After addition of bromomethylcyclohexane (0.46 g), the mixture was stirred at 60° C. for 2 days. The reaction mixture was added to diethyl ether, and the resulting precipitates were washed with diethyl ether and then dried to give a poly(phenylene ether) resin (104 mg).

Example 3

To N,N-dimethylformamide (2.0 mL) were added poly[2-[3-(N,N-dimethylamino)propyl]-6-methyl-1,4-phenylene ether] (0.20 g), 1,8-diiodooctane (12 mg) and anhydrous potassium carbonate (0.15 g), and the mixture was stirred at 60° C. for 3 days. After addition of bromomethylcyclohexane (0.46 g), the mixture was stirred at 60° C. for 2 days. The reaction mixture was added to diethyl ether, and the resulting precipitates were washed with diethyl ether and then dried to give a poly(phenylene ether) resin (124 mg).

Example 4

To N,N-dimethylformamide (2.0 mL) were added poly[2-[3-(N,N-dimethylamino)propyl]-6-methyl-1,4-phenylene ether] (0.20 g), 1,8-diiodooctane (26 mg) and anhydrous potassium carbonate (0.15 g), and the mixture was stirred at 60° C. for 3 days. After addition of bromomethylcyclohexane (0.46 g), the mixture was stirred at 60° C. for 2 days. The reaction mixture was added to diethyl ether, and the resulting precipitates were washed with diethyl ether and then dried to give a poly(phenylene ether) resin (114 mg).

Example 5

To chloroform (8 mL) were added poly[2-(3-bromopropyl)-6-methyl-1,4-phenylene ether] (0.20 g), N,N,N',N'-tetramethyl-1,8-diaminooctane (3.53 mg) and water (2.5 mL), and the mixture was stirred overnight at 60° C. After addition of a 28% aqueous trimethylamine solution (1.86 mL), the mixture was stirred at 60° C. for 2 days. The reaction mixture was evaporated. The residue was dissolved in a small amount of methanol, precipitated with a 2N hydrochloric acid and collected by centrifugation. Then, this sequence of procedure for precipitation was repeated twice, and the obtained reprecipitates were dried to give a poly(phenylene ether) resin (174 mg).

Example 6

To chloroform (10 mL) were added poly[2-(3-bromopropyl)-6-methyl-1,4-phenylene ether] (0.20 g), N,N,N',N'-tetramethyl-1,8-diaminooctane (7.1 mg) and water (2.5 mL), and the mixture was stirred overnight at 60° C. After addition of a 28% aqueous trimethylamine solution (1.86 mL), the mixture was stirred at 60° C. for 2 days. The reaction mixture was evaporated. The residue was dissolved in a small amount of methanol, precipitated with a 2N hydrochloric acid and collected by centrifugation. Then, this sequence of procedure for precipitation was repeated twice, and the obtained reprecipitates were dried to give a poly(phenylene ether) resin (179 mg).

Example 7

To chloroform (410 mL) were added poly[2-(3-bromopropyl)-6-methyl-1,4-phenylene ether] (41 g), N,N,N',N'-tetramethyl-1,8-diaminooctane (2.7 g), tetrabutylammonium iodide (6.6 g), anhydrous potassium carbonate (4.0 g) and water (140 mL), and the mixture was stirred overnight at 60° C. After addition of a 28% aqueous trimethylamine solution (190 mL), the mixture was stirred at 60° C. for 2 days. The reaction mixture was added to acetone, and a 2N hydrochloric acid was added to the resulting precipitates. The mixture was stirred for 3 hours, and the precipitates were collected by centrifugation and dried to give a poly(phenylene ether) resin (30 g).

IR (film): 1188, 1469, 1602, 2938 cm$^{-1}$

Example 8

To chloroform (3 mL) were added poly[2-(3-bromopropyl)-6-methyl-1,4-phenylene ether] (0.30 g), N,N,N',N'-tetramethyl-1,8-diaminooctane (5.6 mg), tetrabutylammonium iodide (48.8 mg), anhydrous potassium carbonate (30 mg) and water (1.0 mL), and the mixture was stirred overnight at 60° C. After addition of N,N-dimethylcyclohexylamine (504 mg), the mixture was stirred at 60° C. for 2 days. The reaction mixture was evaporated. After the residue swelled in a small amount of methanol, a 2N hydrochloric acid was added, and the mixture was stirred, and the precipitates were collected by centrifugation. Then, this sequence of procedure for precipitation was repeated twice, and the obtained reprecipitates were dried to give a poly(phenylene ether) resin (194 mg).

Example 9

To chloroform (3 mL) were added poly[2-(3-bromopropyl)-6-methyl-1,4-phenylene ether] (0.30 g), N,N,N',N'-tetramethyl-1,8-diaminooctane (11.2 mg), tetrabutylammonium iodide (48.8 mg), anhydrous potassium carbonate (30 mg) and water (1.0 mL), and the mixture was stirred overnight at 60° C. After addition of N,N-dimethylcyclohexylamine (504 mg), the mixture was stirred at 60° C. for 2 days. The reaction mixture was evaporated. After the residue swelled in a small amount of methanol, a 2N hydrochloric acid was added, and the mixture was stirred, and the precipitates were collected by centrifugation. Then, this sequence of procedure for precipitation was repeated twice, and the obtained reprecipitates were dried to give a poly(phenylene ether) resin (209 mg).

Example 10

To chloroform (330 mL) were added poly[2-(3-bromopropyl)-6-methyl-1,4-phenylene ether] (35 g), N,N,N',N'-tetramethyl-1,8-diaminooctane (2.3 g), tetrabutylammonium iodide (5.5 g), anhydrous potassium carbonate (3.3 g) and water (110 mL), and the mixture was stirred overnight at 60° C. After addition of N,N-dimethylcyclohexylamine (57 g), the mixture was stirred at 60° C. for 2 days. The reaction mixture was evaporated. After the residue swelled in a small amount of methanol, a 2N hydrochloric acid was added, and the mixture was stirred, and the precipitates were collected by centrifugation. Then, this sequence of procedure for precipitation was repeated twice, and the obtained reprecipitates were dried to give a poly(phenylene ether) resin (31 g).

IR (film): 1188, 1469, 1602, 2938 cm$^{-1}$

Example 11

To the poly(phenylene ether) resin (73.8 mg) obtained in Example 3 was added a 2N hydrochloric acid (11 mL), and the mixture was stirred at room temperature for 2 hours. The resulting residue was collected by filtation and dried in vacuo to give a poly(phenylene ether) resin quantitatively.

Example 12

To chloroform (10 mL) were added poly[2-(3-bromopropyl)-6-methyl-1,4-phenylene ether] (0.20 g), N,N,N',N'-tetramethyl-1,8-diaminooctane (3.53 mg) and water (2.5 mL), and the mixture was stirred at 60° C. for 3 days. After addition of N,N-dimethylcyclohexylamine (21.5 mg), the mixture was stirred at 60° C. for 2 days. After addition of a 28% aqueous trimethylamine solution (0.56 mL), the mixture was stirred at 60° C. for 2 days. The reaction mixture was evaporated, and 10 mL of methanol was added to the residue. The mixture was added to diethyl ether, and the resulting precipitates were collected by centrifugation and dried to give a poly(phenylene ether) resin (49 mg).

Example 13

To chloroform (10 mL) were added poly[2-(3-bromopropyl)-6-methyl-1,4-phenylene ether] (0.20 g), N,N,N',N'-tetramethyl-1,8-diaminooctane (7.1 mg) and water (2.5 mL), and the mixture was stirred at 60° C. for 3 days. After addition of N,N-dimethylcyclohexylamine (20.6 mg), the mixture was stirred at 60° C. for 2 days. After addition of a 28% aqueous trimethylamine solution (0.56 mL), the mixture was stirred at 60° C. for 2 days. The reaction mixture was evaporated and 10 mL of methanol was added to the residue. The mixture was added to diethyl ether, and the resulting precipitates were collected by centrifugation and dried to give a poly(phenylene ether) resin (49 mg).

Example 14

To chloroform (400 mL) were added poly[2-(3-bromopropyl)-6-methyl-1,4-phenylene ether] (42 g), N,N,N',N'-tetramethyl-1,8-diaminooctane (4.9 g), anhydrous potassium carbonate (8.3 g) and water (130 mL), and the mixture was stirred at 60° C. for 3 days. After addition of N,N-dimethylcyclohexylamine (4.70 g), the mixture was stirred at 60° C. for 3 days. After addition of a 28% aqueous trimethylamine solution (157 mL), the mixture was stirred at 60° C. for 4 days. The reaction mixture was allowed to stand, and the chloroform layer was evaporated. The precipitated polymer in the aqueous layer was collected by centrifugation. The polymer was washed with water, acetone, a 2N hydrochloric acid, water, acetone and diethyl ether successively, collected by filtration and dried to give a poly(phenylene ether) resin (41.5 g).

Example 15

To chloroform (3 mL) were added poly[2-(3-bromopropyl)-6-methyl-1,4-phenylene ether] (0.30 g), N,N,N',N'-tetramethyl-1,8-diaminooctane (22.4 mg), tetrabutylammonium iodide (48.8 mg), γ-cyclodextrin (300 mg) and water (1.0 mL), and the mixture was stirred overnight at 60° C. After addition of N,N-dimethylcyclohexylamine (504 mg), the mixture was stirred at 60° C. for 2 days. The reaction mixture was added to acetone, and the resulting precipitates were washed with water. The precipitates were added to a 2N hydrochloric acid, and the mixture was stirred for 3 hours. The precipitates were collected by centrifugation and dried to give a poly(phenylene ether) resin (384 mg).

Example 16

To chloroform (3 mL) were added poly[2-(3-bromopropyl)-6-methyl-1,4-phenylene ether] (0.30 g), N,N,N',N'-tetramethyl-1,8-diaminooctane (22.4 mg), tetrabutylammonium iodide (48.8 mg), polyvinylpyrrolidone (300 mg) and water (1.0 mL), and the mixture was stirred overnight at 60° C. After addition of N,N-dimethylcyclohexylamine (504 mg), the mixture was stirred at 60° C. for 2 days. The reaction mixture was added to acetone, and the resulting precipitates were washed with water. The precipitates were added to a 2N hydrochloric acid, and the mixture was stirred for 3 hours. The precipitates were collected by centrifugation and dried to give a poly(phenylene ether) resin (283 mg).

Example 17

To N,N-dimethylformamide (10 mL) were added poly[2-[3-(N,N-dimethylamino)propyl]-6-methyl-1,4-phenylene ether] (0.27 g), 1,8-diiodooctane (88 mg) and anhydrous potassium carbonate (27 mg), and the mixture was stirred at 60° C. for 2 hours. After addition of iodocyclohexane (1.1 g), the mixture was stirred at 60° C. for 3 days. The reaction mixture was added to diethyl ether, and the resulting precipitates were collected by centrifugation. After the obtained precipitates swelled in N,N-dimethylformamide, the swelling polymer was reprecipitated with diethyl ether, collected by centrifugation and dried in vacuo to give a poly(phenylene ether) resin (362 mg).

Example 18

To chloroform (3.3 mL) were added poly[2-(3-bromopropyl)-6-methyl-1,4-phenylene ether] (0.35 g), N,N,N',N'-tetramethyl-1,4-diaminobutane (17.3 mg), tetrabutylammonium iodide (55 mg), anhydrous potassium carbonate (33 mg) and water (1.1 mL), and the mixture was stirred overnight at 60° C. After addition of N,N-dimethylcyclohexylamine (570 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (366 mg).

Example 19

To chloroform (3.3 mL) were added poly[2-(3-bromopropyl)-6-methyl-1,4-phenylene ether] (0.35 g), N,N,N',N'-tetramethyl-1,12-diaminododecane (17.3 mg), tetrabutylammonium iodide (55 mg), anhydrous potassium carbonate (33 mg) and water (1.1 mL), and the mixture was stirred overnight at 60° C. After addition of N,N-dimethylcyclohexylamine (570 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (366 mg).

Example 20

To chloroform (1 mL) were added poly[2-(3-bromopropyl)-6-methyl-1,4-phenylene ether] (0.1 g), N,N,N',N'-tetramethyl-1,8-diaminooctane (6.7 mg), tetrabutylammonium iodide (16 mg), anhydrous potassium carbonate (9.7 mg) and water (0.5 mL), and the mixture was stirred overnight at 60° C. After addition of an aqueous N,N-dimethylamine solution (50%, 0.4 mL), the mixture was stirred at 60° C. for 2 days. Chloroform was removed, and the resulting precipitates were washed with water and dried to give a poly(phenylene ether) resin (86 mg).

Example 21

To chloroform (500 mL) were added poly[2-[3-(N,N-dimethyl-amino)propyl]-6-methyl-1,4-phenylene ether] (50 g), a solution of 1,8-diiodooctane (7.7 g) in chloroform (30 mL) and water (250 mL), and the mixture was stirred at 60° C. for 2 days. The reaction mixture was poured into methanol (10 L), and the precipitates were collected by filtration. After addition of methanol, the precipitates were sufficiently pulverized in a mortar and then collected by filtration. After addition of a 1N hydrochloric acid, the precipitates were sufficiently pulverized in a mortar and then collected by filtration. The resulting precipitates were washed with a 2N hydrochloric acid (1 L), water, methanol and diethyl ether successively and dried to give a poly(phenylene ether) resin (36.3 g).

IR (KBr) : 1188, 1469, 1602, 2952 $cm^{-1}$

Example 22

To chloroform (1 mL) were added poly[2-[3-(N,N-dimethyl-amino)propyl]-6-methyl-1,4-phenylene ether] (0.1 g), water (0.5 mL) and then a solution of 1,8-diiodooctane (18 mg) in chloroform (0.3 mL) with stirring, and the mixture was stirred overnight at 60° C. The resulting precipitates were washed with methanol and diethyl ether and dried to give a poly (phenylene ether) resin (70 mg).

Example 23

To chloroform (1 mL) were added poly[2-[3-(N,N-dimethyl-amino)propyl]-6-methyl-1,4-phenylene ether] (0.1 g), water (0.5 mL) and then a solution of 1,8-diiodooctane (36 mg) in chloroform (0.3 mL) with stirring, and the mixture was stirred overnight at 60° C. The resulting precipitates were washed with a 1N aqueous sodium hydroxide solution, water, brine, water, methanol and diethyl ether successively and dried to give a poly(phenylene ether) resin (76 mg).

Example 24

To chloroform (1 mL) were added poly[2-[3-(N,N-dimethyl-amino)propyl]-6-methyl-1,4-phenylene ether] (0.1 g), water (0.5 mL) and then a solution of 1,8-diiodooctane (36 mg) in chloroform (0.3 mL) with stirring, and the mixture was stirred overnight at 60° C. The resulting precipitates were washed with a 1N hydrochloric acid, water, methanol and diethyl ether successively and dried to give a poly(phenylene ether) resin (82 mg).

Example 25

To chloroform (3.0 mL) were added poly[2-(3-bromopropyl)-6-methyl-1,4-phenylene ether] (0.30 g), N,N,N',N'-tetramethyl-1,8-diaminooctane (22.4 mg), tetrabutylammonium iodide (48.8 mg), anhydrous potassium carbonate (29.2 mg) and water (1.0 mL), and the mixture was stirred at 60° C. for 2 days. After addition of N,N-dimethyl-3-phenylpropylamine (647 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (375 mg).

Example 26

To chloroform (3.0 mL) were added poly[2-(3-bromopropyl)-6-methyl-1,4-phenylene ether] (0.30 g), N,N, N',N'-tetramethyl-1,8-diaminooctane (22.4 mg), tetrabutylammonium iodide (48.8 mg), anhydrous potassium carbonate (29.2 mg) and water (1.0 mL), and the mixture was stirred at 60° C. for 2 days. After addition of N-methylimidazole (325 mg), the mixture was stirred at 60° C. for 2 days. The resulting precipitates were washed with acetone (40 mL × 2) and 1N hydrochloric acid (40 mL). Then, the precipitates were washed with water until the filtrate was neutral, washed with acetone and dried to give a poly(phenylene ether) resin (271 mg).

Example 27

To chloroform (1 mL) were added poly[2-[3-(N,N-dimethyl-amino)propyl]-6-methyl-1,4-phenylene ether] (0.10 g), water (0.5 mL) and 1,8-diiodooctane (23 mg), and the mixture was stirred overnight at 60° C. for 2 days. The resulting precipitates were washed with acetone (40 mL × 2), a 1N hydrochloric acid (40 mL) and acetone, and then dried to give a poly(phenylene ether) resin (70.3 mg).

Example 28

To chloroform (3.0 mL) were added poly[2-(3-bromopropyl)-6-methyl-1,4-phenylene ether] (0.30 g), N,N,N',N'-tetramethyl-1,8-diaminooctane (22.4 mg), tetrabutylammonium iodide (48.8 mg), anhydrous potassium carbonate (29.2 mg) and water (1.0 mL), and the mixture was stirred at 60° C. for 2 days. After addition of N,N-dimethylbutylamine (401 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (289 mg).

Example 29

To chloroform (3.0 mL) were added poly[2-(3-bromopropyl)-6-methyl-1,4-phenylene ether] (0.30 g), N,N, N',N'-tetramethyl-1,8-diaminooctane (22.4 mg), tetrabutylammonium iodide (48.8 mg), anhydrous potassium carbonate (29.2 mg) and water (1.0 mL), and the mixture was stirred at 60 ° C. for 2 days. After addition of N,N-dimethyldodecylamine (845 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (181 mg).

Example 30

To chloroform (3.0 mL) were added poly[2-(3-bromopropyl)-6-methyl-1,4-phenylene ether] (0.30 g), N,N, N',N'-tetramethyl-1,8-diaminooctane (22.4 mg), tetrabutylammonium iodide (48.8 mg), anhydrous potassium carbonate (29.2 mg) and water (1.0 mL), and the mixture was stirred at 60° C. for 2 days. After addition of N-methylpiperidine (393 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (330 mg).

Example 31

To chloroform (3.0 mL) were added poly[2-(3-bromopropyl)-6-methyl-1,4-phenylene ether] (0.30 g), N,N, N',N'-tetramethyl-1,8-diaminooctane (22.4 mg), tetrabutylammonium iodide (48.8 mg), anhydrous potassium carbonate (29.2 mg) and water (1.0 mL), and the mixture was stirred at 60° C. for 2 days. After addition of N,N-dimethylcyclohexylmethylamine (559 mg), the mixture was stirred at 60° C. for 2 days. The resulting precipitates were washed with acetone (40 mL × 2) and a 1N hydrochloric acid (40 mL). Then, the precipitates were washed with water until the filtrate was neutral, washed with acetone and dried to give a poly(phenylene ether) resin (317 mg).

Example 32

To toluene (2.0 mL) were added poly[2-(3-chloropropyl)-6-methyl-1,4-phenylene ether] (200 mg), N,N,N',N'-tetramethyl-1,6-diaminohexane (26.5 mg), tetrabutylammonium iodide (41 mg), anhydrous potassium carbonate (15 mg) and water (0.7 mL), and the mixture was stirred at 100° C. for 2 days. After addition of N,N-dimethylbutylamine (334 mg), the mixture was stirred at 100° C. for 2 days. The resulting mixture was washed with acetone (40 mL × 2) and a 2N hydrochloric acid (40 mL × 2). Then, the precipitates were washed with water until the filtrate was neutral, washed with acetone (40 mL × 2) and dried to give a poly(phenylene ether) resin (210 mg).

Example 33

To toluene (200 mL) were added poly[2-(3-chloropropyl)-6-methylphenylene ether] (20.0 g), N,N,N',N'-tetramethyl-1,6-diaminohexane (2.64 g), tetrabutylammonium iodide (4.04 g), anhydrous potassium carbonate (1.51 g) and water (70 mL), and the mixture was stirred at 100° C. for 2 days. After addition of N,N-dimethylbutylamine (33.2 g), the mixture was stirred at 100° C. for 2 days. The resulting mixture was washed with acetone (750 mL × 2) and a 2N hydrochloric acid (750 mL × 2). Then, the precipitates were washed with water until the filtrate was neutral, washed with acetone (750 mL × 2) and dried to give a poly(phenylene ether) resin (26.5 g).

Example 34

To toluene (150 mL) were added poly[2-(3-chloropropyl)-6-methylphenylene ether] (15.0 g), N,N,N',N'-tetramethyl-1,6-diaminohexane (1.13 g), tetrabutylammonium iodide (3.03 g), anhydrous potassium carbonate (1.13 g) and water (50 mL), and the mixture was stirred at 100° C. for 2 days. After addition of N,N-dimethylcyclohexylamine (31.4 g), the mixture was stirred at 100° C. for 2 days. The resulting mixture was washed with acetone (500 mL × 2), a 2N hydrochloric acid (1 L) and a 1N hydrochloric acid (1 L). Then, the precipitates were washed with water until the filtrate was neutral, washed with acetone (500 mL × 2) and dried to give a poly(phenylene ether) resin (14.5 g).

Test Example 1

In vitro test

1) Determination of the bound quantity of bile acids

To a poly(phenylene ether) resin (10 mg) or sea sand (40 mg) as inactive control in a polypropylene tube was added 4.5 ml of a 0.3M phosphate buffer (pH=6.0) containing 10 mM sodium glycocholate or 15 mM sodium taurodeoxycholate. After incubation overnight at room temperature, the mixture was centrifuged at 17,000 g for 10 minutes. The quantity of bile acids in the supernatant were determined by enzymatic method (Sotanjusantesutowako made by Wako Pure Chemical Industries, Ltd.), and the bound quantity of bile acids to the poly (phenylene ether) resin (A) was calculated. The bound quantity of bile acids to the poly (phenylene ether) resin is shown as mmol bile acid/g resin.

2) Determination of the dissociation quantity of bound bile acids

To a bile acid bound poly(phenylene ether) resin or sea sand was added 4.5 ml of a 0.3M phosphate buffer (pH=8.0). After incubation at room temperature overnight, the mixture was centrifuged at 17,000 g for 10 minutes. The quantity of bile acids in the supernatant were determined by enzymatic method (Sotanjusantesutowako made by Wako Pure Chemical Industries, Ltd.), and the dissociation quantity of bile acids from resin (B) and the dissociation quantity of bile acids from sea sand (C) were calculated.

The dissociation rate was shown as percentage and calculated by the following formula.

Dissociation rate (%) =

$$\frac{[\text{Dissociation quantity of bile acids from resin }(B)] - [\text{Dissociation quantity of bile acids from sea sand }(C)]}{\text{Bound quantity of bile acids to resin }(A)} \times 100$$

TABLE 1

| | Bound quantity (mmol/g resin) | | Dissociation rate (%) | |
|---|---|---|---|---|
| | sodium glyco-cholate | sodium taurodeoxy-cholate | sodium glyco-cholate | sodium taurodeoxy-cholate |
| Compound of Example 7 | 2.51 | 3.61 | 33 | 4 |
| Compound of Example 10 | 2.57 | 2.75 | 29 | 5 |
| Compound of Example 14 | 2.55 | 3.41 | 35 | 9 |
| Compound of Example 21 | 2.19 | 2.17 | 40 | 4 |
| Compound of Example 32 | 2.36 | 2.07 | 28 | 9 |
| Compound of Example 33 | 2.22 | 3.25 | 36 | 5 |
| Compound of Example 34 | 2.10 | 2.54 | 31 | 7 |
| Dowx 1 × 2 dried resin | 2.28 | 2.38 | 49 | 0 |

Test Example 2

In vivo test using hamsters

The hypocholesterolemic activity of the poly(phenylene ether) resins of the present invention was determined using hamsters. Male hamsters (5 weeks, 75–80 g, n=10) were used in this study. A normal diet group was given a normal diet (CE-2 made by Clea Japan, Inc.). A high cholesterol diet group was given a normal diet containing a 0.5% cholesterol (high cholesterol diet). Test compound diet groups were given a high cholesterol diet containing test compound which was cholestyramine (0.5, 1.0, 3.0%, Dowx 1×2 dried resin) or the poly(phenylene ether) resin of the present invention (0.25, 0.5, 1.0%). All animals were received these diets for 14 days and fasted for 24 hours. And then, blood was collected from the abdominal vein to measure serum cholesterol level of each group. Total cholesterol level was enzymatically determined by an autoanalyzer (RA-1000 made by Technicon Co., LTD.). The total serum cholesterol lowering activity by the administration of test compounds was estimated as follows. Namely, after the inhibition ratio was determined by the following equation, $EC_{100}$ was calculated as the weight percentage of resin to the diet to lower the serum cholesterol level (about 300 mg/dl) of hamsters fed the high cholesterol diet to that (about 200 mg/dl) of hamsters fed the normal diet. The following table indicates $EC_{100}$ of cholestyramine and the poly(phenylene ether) resins of the present invention. Thus, the poly (phenylene ether) resins of the present invention had cholesterol lowering effect equal to or higher than that of cholestyramine at a dose of from ⅕ to ¼ of cholestyramine. Inhibition ratio (%)=[1-(s—n)/(c—n)]×100 s:Total serum cholesterol level of test compound diet group n:Total serum cholesterol level of normal diet group c:Total serum cholesterol level of high cholesterol diet group

TABLE 2

|  | $EC_{100}$ (%) |
|---|---|
| Dowx 1 × 2 dried resin | 2.8 |
| Compound of Example 33 | 0.5 |
| Compound of Example 34 | 0.7 |

Industrial Applicability

The poly(phenylene ether) resins of the present invention are characteristic of possessing ω-ammoniumalkyl groups where length of alkylene chain between the benzene ring and the ammonium group is three or more and remarkable effect of adsorbing bile acids. Furthermore, the poly (phenylene ether) resins of the present invention have no amine smell due to degradation of amine part and extreme stability. In addition, the poly(phenylene ether) resins of the present invention are insoluble in water because of crosslinkage at the position of the ammonium group, and therefore have high safety. Accordingly, the poly(phenylene ether) resins of the present invention are useful as an excellent medicament for a cholesterol lowering agent.

We claim:

1. A poly(phenylene ether) resin composed of structural units represented by the general formula:

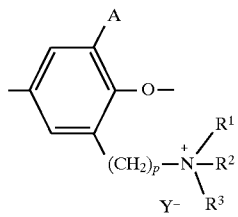
(I)

wherein $R^1$, $R^2$ and $R^3$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom provided that two or more of $R^1$, $R^2$ and $R^3$ do not represent a hydrogen atom at the same time, or one of $R^1$, $R^2$ and $R^3$ represents an alkyl group having from 1 to 12 carbon atoms or a hydrogen atom while the others are adjacent to each other and together form a saturated ring together with the nitrogen atom binding to them, which may have one or more additional hetero atoms, or $R^1$, $R^2$ and $R^3$ are adjacent to each other and together form an aromatic ring together with the nitrogen atom binding to them, which may have one or more additional hetero atoms; A represents an alkyl group having from 1 to 3 carbon atoms; p is an integer of from 3 to 5; and $Y^-$ represents a pharmaceutically acceptable acid residue and structural units represented by the general formula:

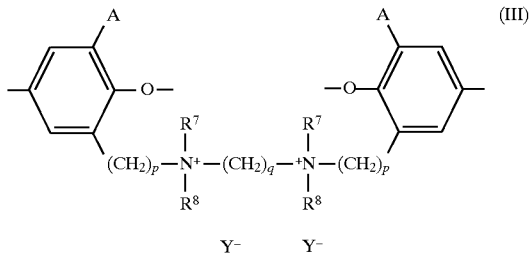
(III)

wherein $R^7$ and $R^8$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^7$ and $R^8$ are adjacent to each other and together form a saturated ring together with the nitrogen atom binding to them, which may have one or more additional hetero atoms; A represents an alkyl group having from 1 to 3 carbon atoms; p is an integer of from 3 to 5; q is an integer of from 3 to 20; and $Y^-$ represents a pharmaceutically acceptable acid residue wherein the content of the structural units represented by the general formula (I) amounts to 40 to 96% by mole and the content of the structural units represented by the general formula (III) amounts to 4 to 60% by mole based upon the content of the phenylene ether component.

2. A poly(phenylene ether) resin as claimed in claim 1, composed of structural units represented by the general formula:

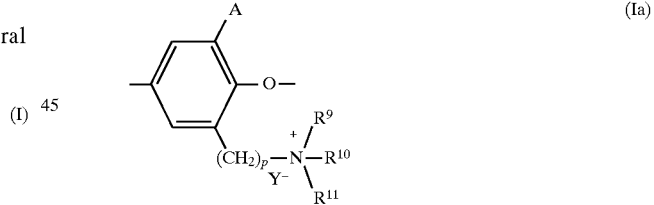
(Ia)

wherein $R^9$, $R^{10}$ and $R^{11}$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom provided that two or more of $R^9$, $R^{10}$ and $R^{11}$ do not represent a hydrogen atom at the same time, or one of $R^9$, $R^{10}$ and $R^{11}$ represents an alkyl group having from 1 to 12 carbon atoms or a hydrogen atom while the others are adjacent to each other and together form a saturated ring together with the nitrogen atom binding to them, which may have one or more additional hetero atoms; A represents an alkyl group having from 1 to 3 carbon atoms; p is an integer from 3 to 5; and $Y^-$ represents a pharmaceutically acceptable acid residue and structural units represented by the general formula:

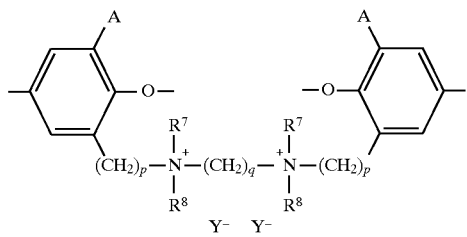

(III)

wherein $R^7$, and $R^8$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^7$ and $R^8$ are adjacent to each other and together form a saturated ring together with the nitrogen atom binding to them, which may have one or more additional hetero atoms; A represents an alkyl group having from 1 to 3 carbon atoms; p is an integer of from 3 to 5; q is an integer of from 3 to 20; and $Y^-$ represents a pharmaceutically acceptable acid residue wherein the content of the structural units represented by the general formula (Ia) amounts to 40 to 96% by mole and the content of the structural units represented by the general formula (III) amounts to 4 to 60% by mole based upon the content of the phenylene ether component.

3. A poly(phenylene ether) resin as claimed in claim 2, composed of structural units represented by the general formula:

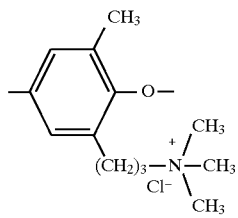

(VIIIa)

wherein $R^{19}$ represents a cyclohexyl group or a n-butyl group and structural units represented by the general formula:

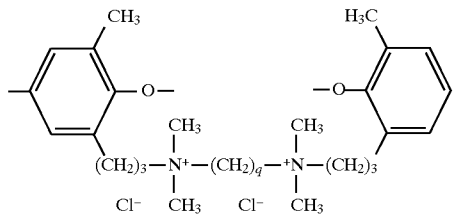

(IXa)

wherein q is an integer of from 3 to 20 wherein the content of the structural units represented by the general formula (VIIIa) amounts to 40 to 96% by mole and the content of the structural units represented by the general formula (IXa) amounts to 4 to 60% by mole based upon the content of the phenylene ether component.

4. A process for production of the poly(phenylene ether) resin as claimed in claim 2, which comprises subjecting a poly(phenylene ether) compound represented by the general formula:

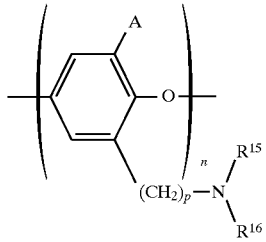

wherein $R^{15}$ and $R^{16}$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^{15}$ and $R^{16}$ are adjacent to each other and together form a saturated ring with the nitrogen atom binding to them, which may have one or more additional hetero atoms; A represents an alkyl group having from 1 to 3 carbon atoms; p is an integer of from 3 to 5; and n is an integer of from 10 to 10,000, to crosslinking using a dihalide compound represented by the general formula:

$$X-(CH_2)_q-X$$

wherein X represents a chlorine atom, a bromine atom or an iodine atom; and q is an integer of from 3 to 20, and optionally subjecting the resulting compound to reaction with a halide compound represented by the general formula:

$$R^{18}-X$$

wherein $R^{18}$ represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms; and X represents a chlorine atom, a bromine atom or an iodine atom.

5. A poly(phenylene ether) resin obtained by a process which comprises subjecting a poly(phenylene ether) compound represented by the general formula:

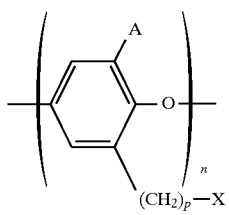

wherein A represents an alkyl group having from 1 to 3 carbon atoms; X represents a chlorine atom, a bromine atom or an iodine atom; p is an integer of from 3 to 5; and n is an integer of from 10 to 10,000, to crosslinking using a diamine compound represented by the general formula:

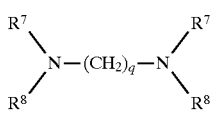

wherein $R^7$ and $R^8$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^7$ and $R^8$ are adjacent to each other and together form a saturated ring together with the nitrogen atom binding to them, which may have one or more additional hetero atoms; and q is an integer of from 3 to 20, and subjecting the resulting compound to reaction with one or two amine compounds represented by the general formula:

wherein $R^1$, $R^2$ and $R^3$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom provided that two or more of $R^1$, $R^2$ and $R^3$ do not represent a hydrogen atom at the same time, or one of $R^1$, $R^2$ and $R^3$ represents an alkyl group having from 1 to 12 carbon atoms or a hydrogen atom while the others are adjacent to each other and together form a saturated ring together with the nitrogen atom binding to them, which may have one or more additional hetero atoms, or $R^1$, $R^2$ and $R^3$ are adjacent to each other and together form an aromatic ring with the nitrogen atom binding to them, which may have one or more additional hetero atoms.

6. A poly(phenylene ether) resin obtained by the process as claimed in claim 4, which comprises subjecting a poly(phenylene ether) compound represented by the general formula:

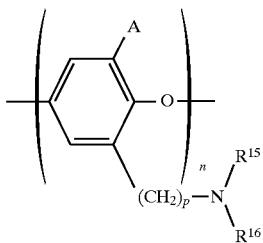

wherein $R^{15}$ and $R^{16}$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^{15}$ and $R^{16}$ are adjacent to each other and together form a saturated ring with the nitrogen atom binding to them, which may have one or more additional hetero atoms; A represents an alkyl group having from 1 to 3 carbon atoms; p is an integer of from 3 to 5; and n is an integer of from 10 to 10,000, to crosslinking using a dihalide compound represented by the general formula:

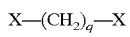

wherein X represents a chlorine atom, a bromine atom or an iodine atom; and q is an integer of from 3 to 20, and optionally subjecting the resulting compound to reaction with a halide compound represented by the general formula:

wherein $R^{18}$ represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms; and X represents a chlorine atom, a bromine atom or an iodine atom.

7. A pharmaceutical composition comprising, as an active ingredient, a poly(phenylene ether) resin as claimed in claim 1, composed of structural units represented by the general formula:

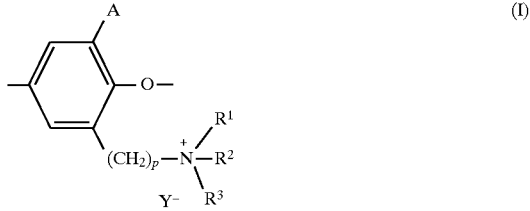

wherein $R^1$, $R^2$ and $R^3$ are the same or different and each represents an alkyl group having from 1 to 12 carbon atoms, a cycloalkyl group having from 3 to 15 carbon atoms, a cycloalkylalkyl group having from 4 to 15 carbon atoms, an aralkyl group having from 9 to 15 carbon atoms or a hydrogen atom provided that two or more of $R^1$, $R^2$ and $R^3$ do not represent a hydrogen atom at the same time, or one of $R^1$, $R^2$ and $R^3$ represents an alkyl group having from 1 to 12 carbon atoms or a hydrogen atom while the others are adjacent to each other and together form a saturated ring together with the nitrogen atom binding to them, which may have one or more additional hetero atoms, or $R^1$, $R^2$ and $R^3$ are adjacent to each other and together form an aromatic ring together with the nitrogen atom binding to them, which may have one or more additional hetero atoms; A represents an alkyl group having from 1 to 3 carbon atoms; p is an integer of from 3 to 5; and $Y^-$ represents a pharmaceutically acceptable acid residue and structural units represented by the general formula:

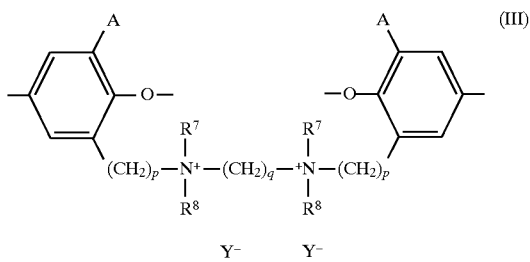

wherein $R^7$ and $R^8$ are the same or different and each represents an alkyl group having from 1 to 12 carbon atoms, a cycloalkyl group having from 3 to 15 carbon atoms, a cycloalkylalkyl group having from 4 to 15 carbon atoms or an aralkyl group having from 9 to 15 carbon atoms, or $R^7$ and $R^8$ are adjacent to each other and together form a saturated ring together with the nitrogen atom binding to them, which may have one or more additional hetero atoms; A represents an alkyl group having from 1 to 3 carbon atoms; p is an integer of from 3 to 5; q is an integer of from 3 to 20; and $Y^-$ represents a pharmaceutically acceptable acid residue wherein the content of the structural units represented by the general formula (I) amounts to 40 to 96% by mole and the content of the structural units represented by the general formula (III) amounts to 4 to 60% by mole based upon the content of the phenylene ether component.

8. A pharmaceutical composition comprising, as an active ingredient, a poly(phenylene ether) resin as claimed in claim 3, composed of structural units represented by the general formula:

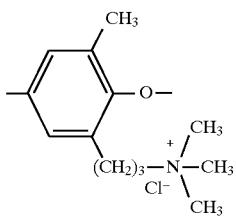

wherein $R^{19}$ represents a cyclohexyl group or a n-butyl group and structural units represented by the general formula:

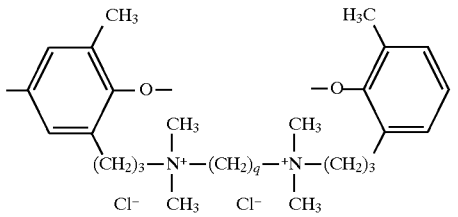

wherein q is an integer of from 3 to 20 wherein the content of the structural units represented by the general formula (VIIIa) amounts to 40 to 96% by mole and the content of the structural units represented by the general formula (IXa) amounts to 4 to 60% by mole based upon the content of phenylene ether component.

9. A cholesterol reducing agent comprising, as an active ingredient, the poly(phenylene ether) resin as claimed in claim 1.

10. A cholesterol reducing agent comprising, as an active ingredient, the poly(phenylene ether) resin as claimed in claim 3.

11. A method for the treatment of hypercholesterolemia which comprises administering an effective amount of the poly(phenylene ether) resin as claimed in claim 1.

12. A method for the treatment of hypercholesterolemia which comprises administering an effective amount of the poly(phenylene ether) resin as claimed in claim 3.

* * * * *